US007603855B2

(12) United States Patent
Strong

(10) Patent No.: US 7,603,855 B2
(45) Date of Patent: Oct. 20, 2009

(54) VALVE WITH MAGNETIC DETENTS

(75) Inventor: Christopher L. Strong, Frederick, CO (US)

(73) Assignee: Illinois Tool Works Inc., Glenview, IL (US)

( * ) Notice: Subject to any disclaimer, the term of this patent is extended or adjusted under 35 U.S.C. 154(b) by 259 days.

(21) Appl. No.: 11/786,009

(22) Filed: Apr. 10, 2007

(65) Prior Publication Data

US 2008/0250919 A1 Oct. 16, 2008

(51) Int. Cl.
*F15B 15/22* (2006.01)
*F16K 11/02* (2006.01)

(52) U.S. Cl. .......................................... 60/370; 91/275

(58) Field of Classification Search .................. 60/370, 60/545; 91/275, 361, 392, 403, 418
See application file for complete search history.

(56) References Cited

U.S. PATENT DOCUMENTS 2,583,185 A 1/1952 McLeod
2,811,979 A 11/1957 Presnell
2,870,789 A 1/1959 Bilaisis
3,190,182 A 6/1965 Jakowchuk
3,255,674 A 6/1966 Nelson et al.
3,304,126 A 2/1967 Rupp et al.
3,465,686 A * 9/1969 Nugier ........................ 91/275
3,592,230 A * 7/1971 Piroutek ................ 137/625.66
3,691,902 A 9/1972 Lebzelter
3,791,768 A 2/1974 Wanner
3,838,946 A 10/1974 Schall
3,850,082 A 11/1974 Nussbaumer
3,943,823 A 3/1976 Tammy
3,991,574 A 11/1976 Frazier
4,042,311 A 8/1977 Yonezawa
4,104,008 A 8/1978 Hoffmann et al.
4,161,308 A 7/1979 Bell et al.
4,224,013 A 9/1980 Davis, Sr.
4,524,803 A 6/1985 Stoll et al.
4,779,513 A 10/1988 Kimura
4,854,832 A 8/1989 Gardner et al.
4,889,035 A * 12/1989 Goodnow .................... 91/275
4,921,408 A 5/1990 Kvinge et al.
4,987,822 A * 1/1991 Stoll ........................ 91/358 R
5,036,886 A 8/1991 Olsen et al.
5,085,179 A 2/1992 Faulkner
5,108,270 A 4/1992 Kozumplik, Jr.
5,161,450 A 11/1992 Ishikawa (Continued)

FOREIGN PATENT DOCUMENTS

DE 29 17 232 A1 11/1979

(Continued)

OTHER PUBLICATIONS

Brochure entitled "Elima-Matic Pumps;" Versa-Matic Pump Company; 2008 IDEX Corporation.

*Primary Examiner*—Thomas E Lazo
(74) *Attorney, Agent, or Firm*—Fletcher Yoder

(57) ABSTRACT

A motor including a piston disposed within a cylinder and a valve configured to control a flow of a fluid into the cylinder. In some embodiments, the valve has a housing, a valve member disposed in the housing, and a magnetic detent configured to resist movement of the valve member within the housing.

20 Claims, 13 Drawing Sheets

U.S. PATENT DOCUMENTS

| | | | | |
|---|---|---|---|---|
| 5,174,731 | A | 12/1992 | Korver | |
| 5,232,352 | A | 8/1993 | Robinson | |
| 5,240,390 | A | 8/1993 | Kvinge et al. | |
| 5,277,099 | A | 1/1994 | Powers | |
| 5,277,555 | A | 1/1994 | Robinson | |
| 5,325,762 | A * | 7/1994 | Walsh et al. | 91/275 |
| 5,326,234 | A | 7/1994 | Versaw et al. | |
| 5,363,739 | A | 11/1994 | Sydow | |
| 5,527,160 | A | 6/1996 | Kozumplik, Jr. et al. | |
| 5,584,666 | A | 12/1996 | Kozumplik, Jr. et al. | |
| 5,586,480 | A | 12/1996 | Gardner | |
| 5,957,670 | A | 9/1999 | Duncan et al. | |
| 5,961,300 | A | 10/1999 | Pitzer et al. | |
| 5,984,646 | A | 11/1999 | Renfro et al. | |
| 6,126,403 | A | 10/2000 | Yamada | |
| 6,152,705 | A | 11/2000 | Kennedy et al. | |
| 6,168,387 | B1 | 1/2001 | Able et al. | |
| 6,168,394 | B1 | 1/2001 | Forman et al. | |
| 6,280,149 | B1 | 8/2001 | Able et al. | |
| 6,371,733 | B1 | 4/2002 | Renfro | |
| 6,431,046 | B1 | 8/2002 | Okpokowuruk | |
| 6,435,845 | B1 | 8/2002 | Kennedy et al. | |
| 6,571,680 | B2 | 6/2003 | Gardner | |
| 6,644,941 | B1 | 11/2003 | Able et al. | |
| 6,722,256 | B2 | 4/2004 | Roberts et al. | |
| 6,865,981 | B2 | 3/2005 | Wiechers et al. | |
| 6,883,417 | B2 | 4/2005 | Headley et al. | |
| 6,901,960 | B2 | 6/2005 | Roberts et al. | |
| 6,935,844 | B1 | 8/2005 | Dukes et al. | |
| 6,962,487 | B2 | 11/2005 | Caldwell | |
| 7,017,469 | B2 * | 3/2006 | Penn | 91/275 |
| 7,063,517 | B2 | 6/2006 | Towne et al. | |
| 7,278,443 | B2 | 10/2007 | Larson | |
| 7,290,561 | B2 | 11/2007 | Larson | |
| 7,367,785 | B2 | 5/2008 | Roberts | |
| 2006/0292016 | A1 | 12/2006 | Hitter et al. | |
| 2008/0250918 | A1 | 10/2008 | Strong | |
| 2008/0253906 | A1 | 10/2008 | Strong | |

FOREIGN PATENT DOCUMENTS

| | | | |
|---|---|---|---|
| DE | 10104616 | A1 * | 8/2002 |
| GB | 1256903 | | 12/1971 |
| GB | 2131891 | | 6/1984 |
| GB | 2 195 711 | A | 4/1988 |
| WO | WO 98/26180 | | 6/1998 |
| WO | WO 2007/016081 | | 2/2007 |
| WO | WO 2007/016151 | | 2/2007 |
| WO | WO 2007/016177 | A2 | 2/2007 |

* cited by examiner

VALVE WITH MAGNETIC DETENTS

BACKGROUND

The present invention relates generally to pneumatic devices and, in certain embodiments, to air motors with valves having magnetic detents.

Pneumatic motors are often used to convert energy stored in the form of compressed air into kinetic energy. For instance, compressed air may be used to drive a reciprocating rod or rotating shaft. The resulting motion may be used for a variety of applications, including, for example, pumping a liquid to a spray gun. In some spray gun applications, the pneumatic motor may drive a pump, and the pump may convey a coating liquid, such as paint.

Conventional pneumatic motors are inadequate in some regards. For example, the mechanical motion produced by the pneumatic motor may not be smooth. Switching devices in pneumatic motors may signal when to re-route pressurized air during a cycle of the motor. When operating, the switching devices may intermittently consume a portion of the kinetic energy that the pneumatic motor would otherwise output. As a result, the output motion or power may vary, and the flow rate of a liquid being pumped may fluctuate. Variations in flow rate may be particularly problematic when pumping a coating liquid to a spray gun. The spray pattern may contract when the flow rate drops and expand when the flow rate rises, which may result in an uneven application of the coating liquid.

The switching devices in conventional pneumatic motors can produce other problems as well. For example, some types of switching devices, such as reed valves, may quickly wear out or be damaged by vibrations from the pneumatic motor, thereby potentially increasing maintenance costs. Further, some types of switching devices may be unresponsive at low pressures, e.g., less than 25 psi. Unresponsive switching devices may impede use of the pneumatic motor in applications where low-speed motion is desired or higher pressure air supplies are not available.

BRIEF DESCRIPTION

The following discussion describes, among other things, a pneumatic motor having a piston and a magnetically actuated valve. The magnetically actuated valve may be adjacent the piston and, in some embodiments, include a spool valve.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, some of the embodiments of the present technique provide a method and apparatus for coordinating air flow in a pneumatic motor. Of course, such embodiments are merely exemplary of the present technique, and the appended claims should not be viewed as limited to those embodiments. Indeed, the present technique is applicable to a wide variety of systems.

As used herein, the words "top," "bottom," "upper," and "lower" indicate relative positions or orientations and not an absolute position or orientation. The term "or" is understood to be inclusive unless otherwise stated. The term "exemplary" is used to indicate that something is merely a representative example and not necessarily definitive or preferred. Herein, references to fluid pressures are gauge pressure (in contrast to absolute pressure) unless otherwise noted.

Figure 1:
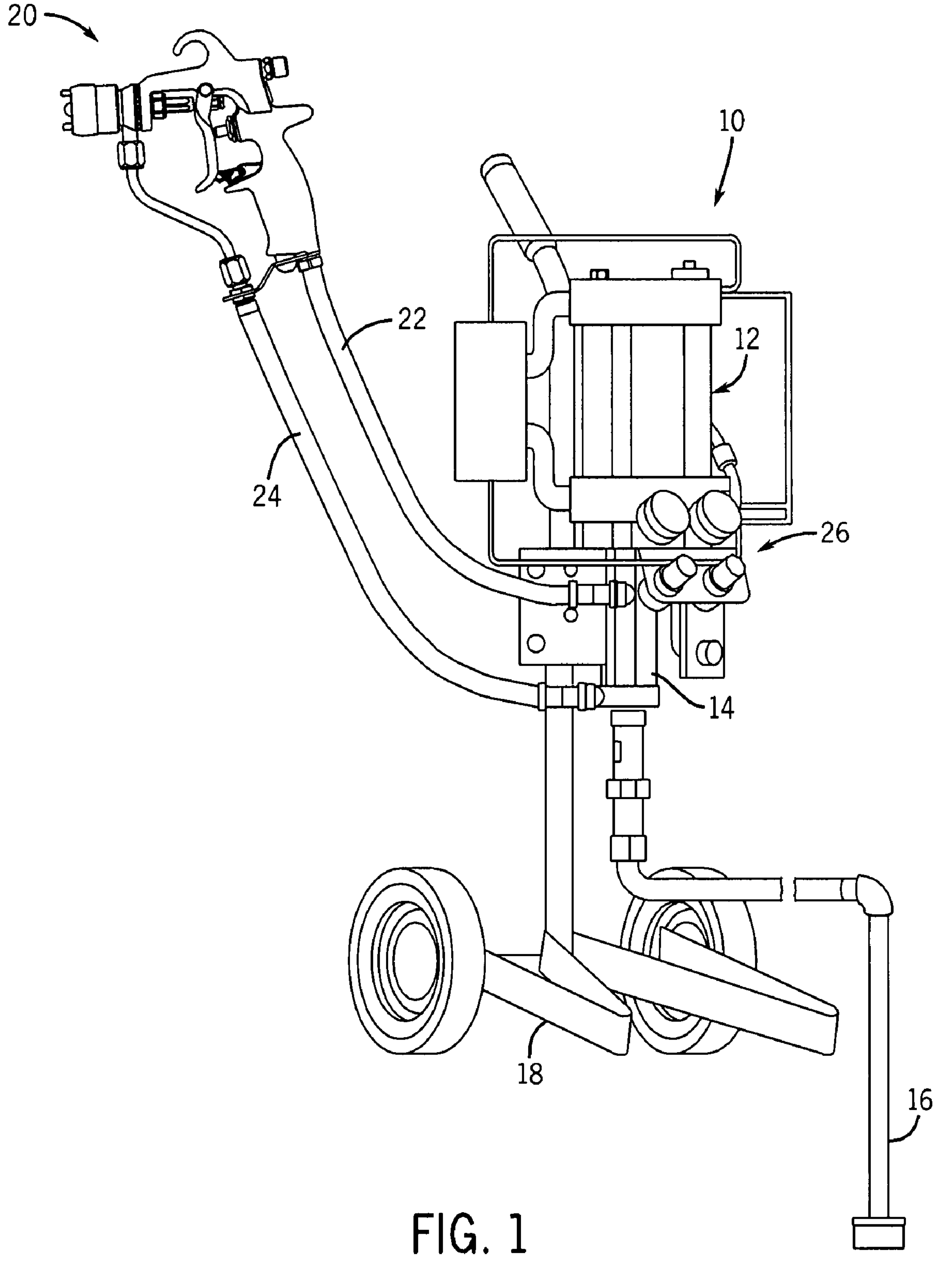
FIG. 1 is a perspective view of an exemplary spray system in accordance with an embodiment of the present technique.

FIG. 1 depicts an exemplary spray system 10. The spray system 10 includes a pneumatic motor 12 that may address one or more of the inadequacies of conventional pneumatic motors discussed above. As described below, in some embodiments, the pneumatic motor 12 includes a magnetically actuated pilot valve that may tend to consume less of the energy that would otherwise be output from the pneumatic motor 12. As a result, the pneumatic motor 12 may facilitate the production of more uniform pumping pressures than conventional devices. Further, in certain embodiments, magnetic actuation of the pilot valve may enable the pneumatic motor 12 to operate even when supplied with low pressure air. It should also be noted that, in some embodiments, the magnetically actuated pilot valve includes a spool valve that is robust to impacts and wear. Relative to conventional devices, these spool valves may tend to have a relatively long operating life. Details of the pneumatic motor 12 are described below after addressing features of the spray system 10.

In addition to the pneumatic motor 12, the exemplary spray system 10 may include a pump 14, a coating liquid inlet 16, a stand 18, a spray gun 20, an air conduit 22, a liquid conduit 24, and a regulator assembly 26. The pump 14 may be a reciprocating pump that is mechanically linked to the pneumatic motor 12 in a manner described further below. In other embodiments, the pump 14 may any of a variety of different types of pumps.

The intake of the pump 14 may be in fluid communication with the coating liquid inlet 16, and the outlet of the pump 14 may be in fluid communication with the liquid conduit 24. The liquid conduit 24 may, in turn, be in fluid communication with a nozzle of the spray gun 20, which may also be in fluid communication with the air conduit 22.

The regulator assembly 26 may be configured to directly or indirectly regulate air pressure in the air conduit 22, the pressure of air driving pneumatic motor 12, and/or the pressure of a coating liquid within the liquid conduit 24. Additionally, the regulator assembly 26 may include pressure gauges to display one or more of these pressures.

In operation, the pneumatic motor 12 may translate air pressure into movement of the pump 14. Rotating pumps 14 may be driven by a crankshaft connected to the pneumatic motor 12, and reciprocating pumps 14 may be directly linked to the pneumatic motor 12 by a rod, as explained below. The pump 14 may convey a coating liquid, such as paint, varnish, or stain, through the coating liquid inlet 16, the liquid conduit 24, and the nozzle of the spray gun 20. Pressurized air flowing through the air conduit 22 may help to atomize the coating liquid flowing out of the spray gun 20 and form a spray pattern. As discussed above, the pressure of the coating liquid may affect the spray pattern. Pressure fluctuations may cause the spray pattern to collapse and expand.

Figure 2:
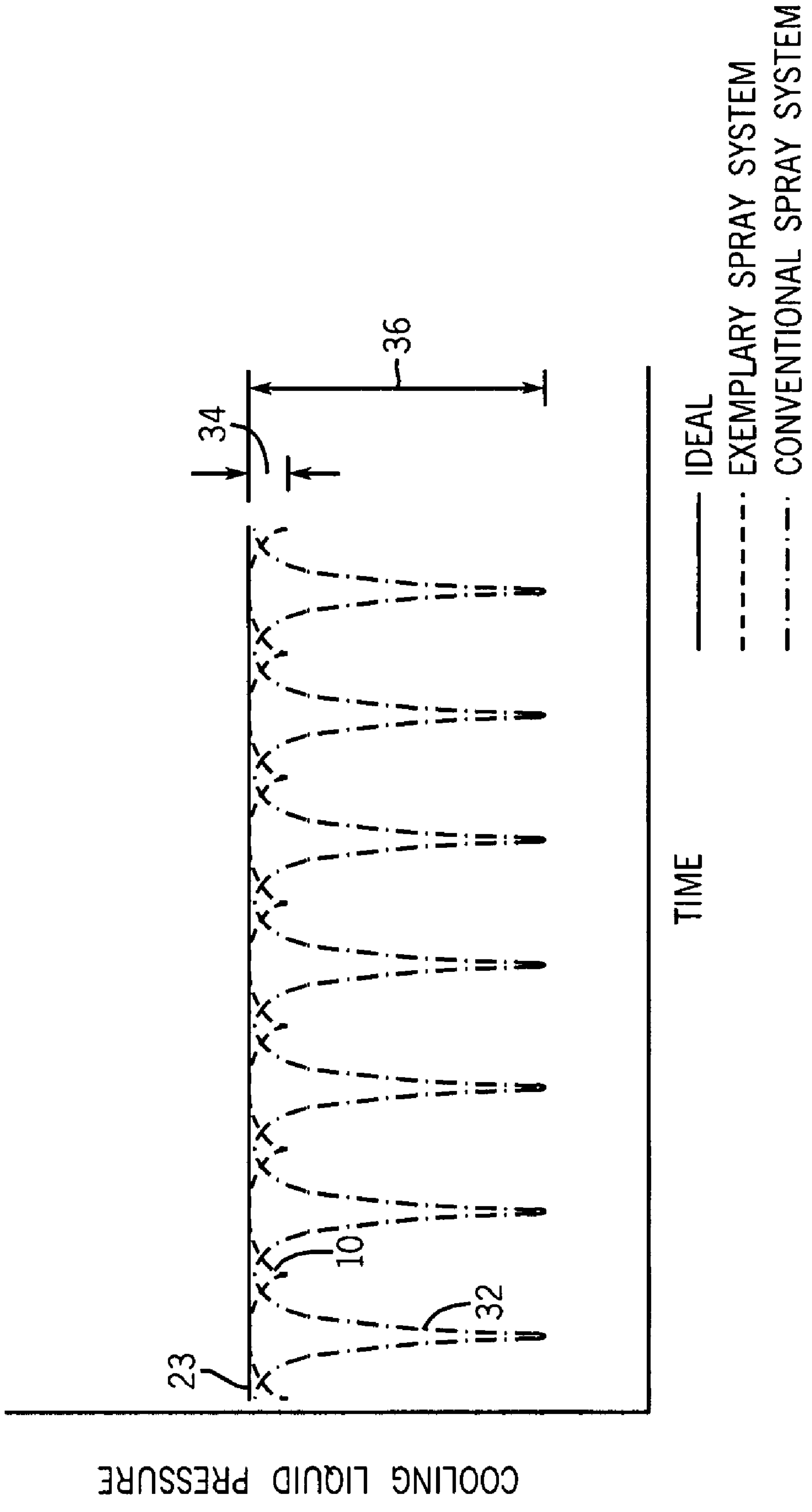
FIG. 2 is a graph of pressure of the coating liquid versus time for various types of spray systems.

FIG. 2 is a graph of coating liquid pressure versus time for three types of spray systems: an ideal system 23, the exemplary spray system 10, and a conventional spray system 32. (The conventional spray system 32 is shown with an arbitrarily selected one-half cycle phase shift to highlight differences between the systems.) As illustrated by FIG. 2, in the two non-ideal systems 10 and 32, the coating liquid pressure fluctuates. However, the exemplary spray system 10 has a variation 34 that is smaller than a variation 36 of the conventional spray system. The features of the exemplary spray system 10 that may tend to enable relatively small variation 34 in coating liquid pressure are discussed below.

Figure 3:
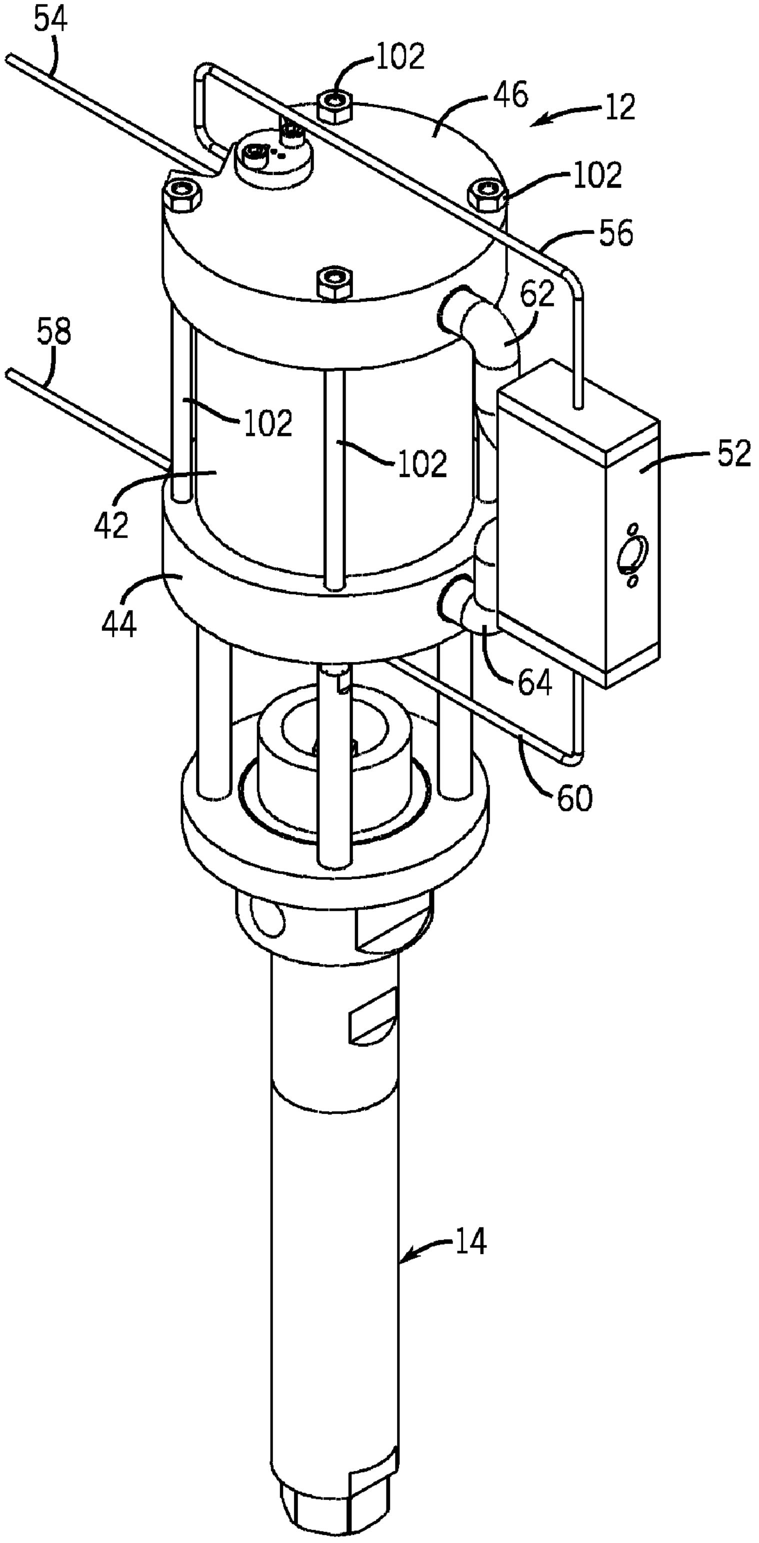
FIG. 3 is a perspective view of an exemplary pneumatic motor in accordance with an embodiment of the present technique.
Figure 6:
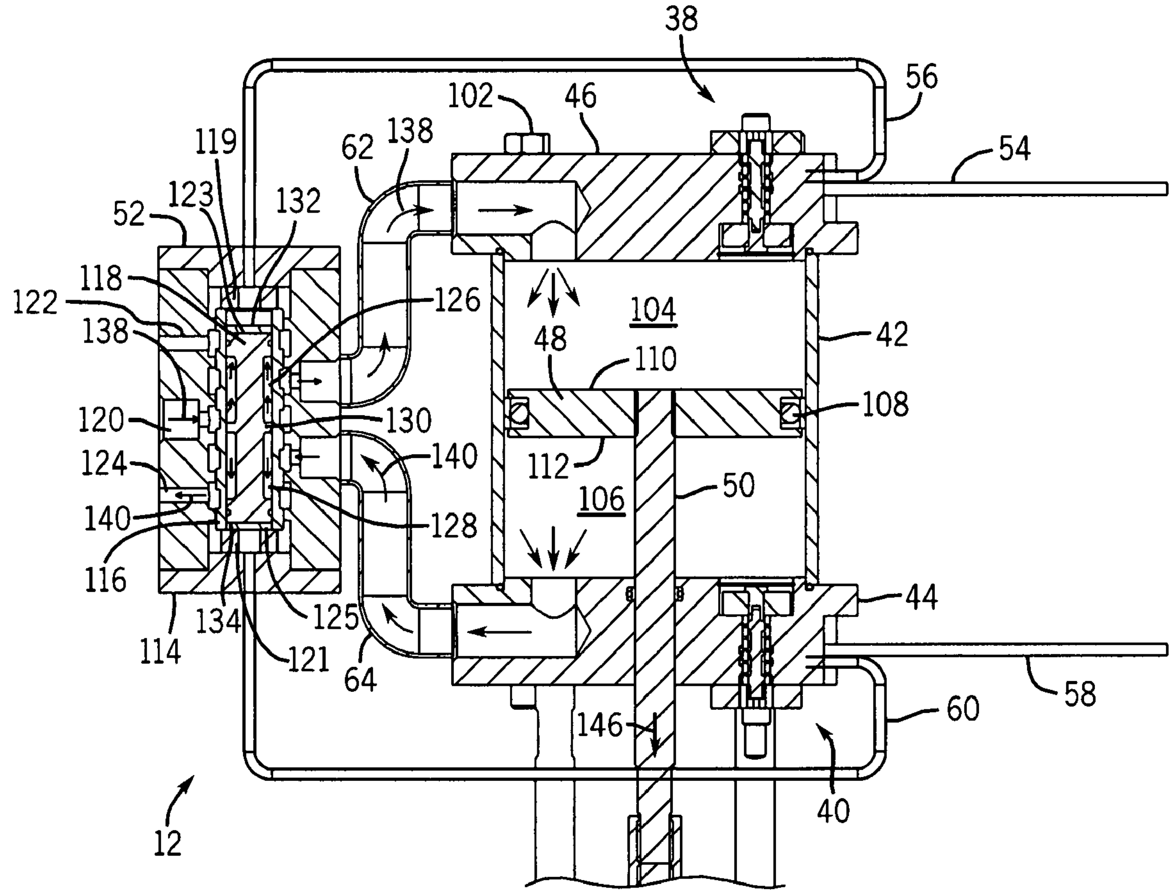
Figure 7:
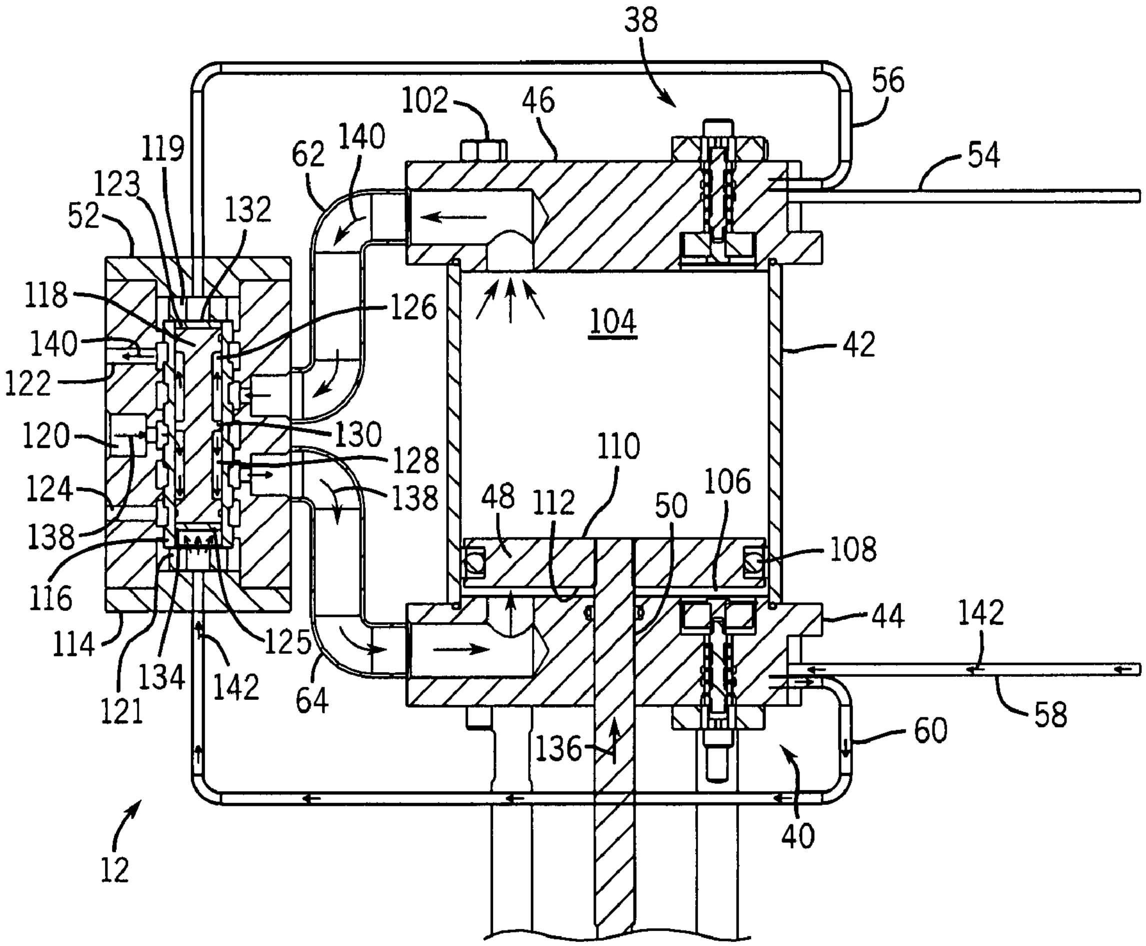
Figure 8:
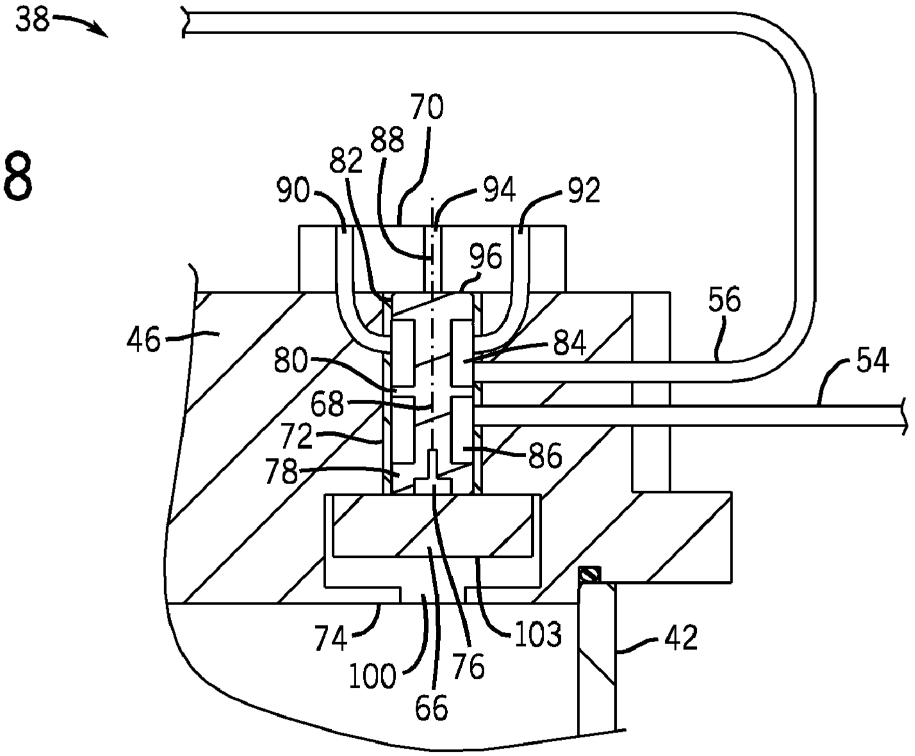
FIGS. 8-9 are cross-sectional views of a magnetically actuated pilot valve in two different states.
Figure 9:
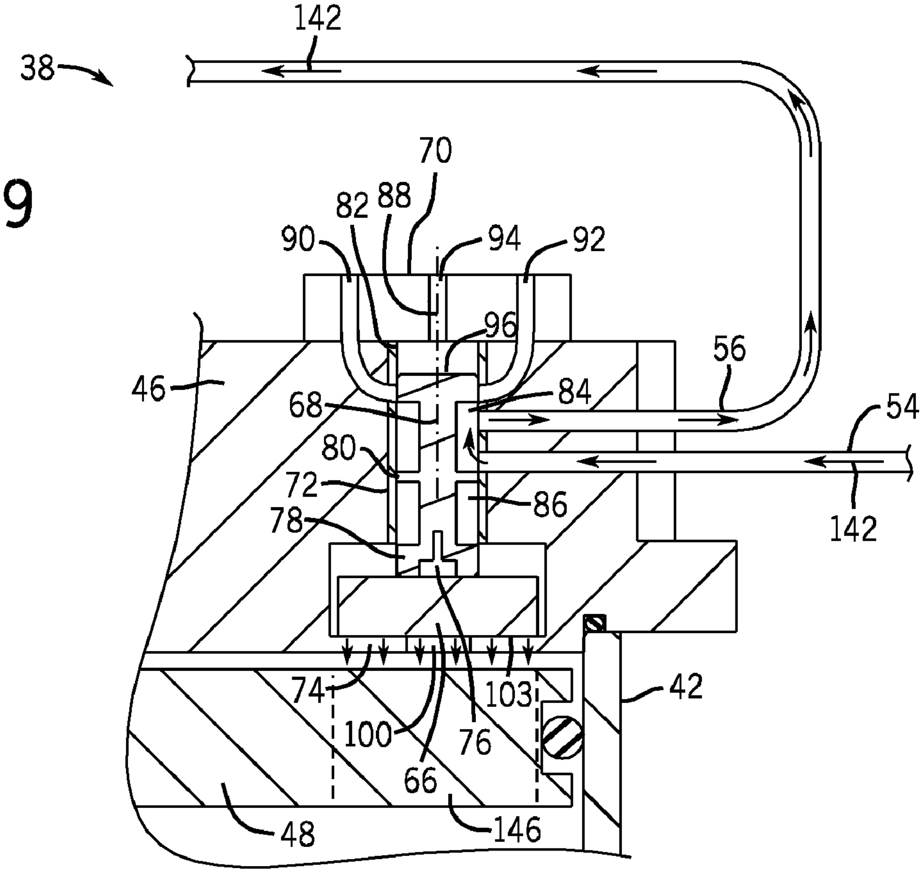
Figure 10:
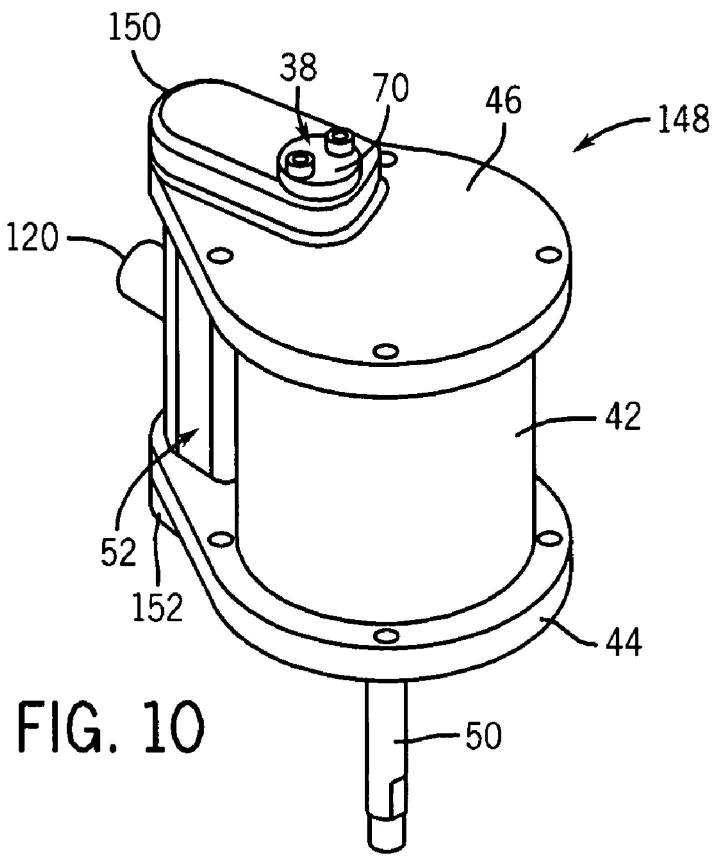
FIG. 10 is a perspective view of another pneumatic motor in accordance with an embodiment of the present technique.

FIGS. 3-9 illustrate details of the pneumatic motor 12. FIG. 3 is a perspective view of the pneumatic motor 12 and the pump 14. FIGS. 4-7 are cross-sectional views of the pneumatic motor 12 in sequential stages of an energy conversion cycle, and FIGS. 8 and 9 are cross-sectional views of a switching device in the pneumatic motor 12. FIGS. 8 and 9 illustrate two states assumed by the switching device during various portions of the cycle. After describing the components of the pneumatic motor 12, their operation during the energy conversion cycle will be explained.

Figure 4:
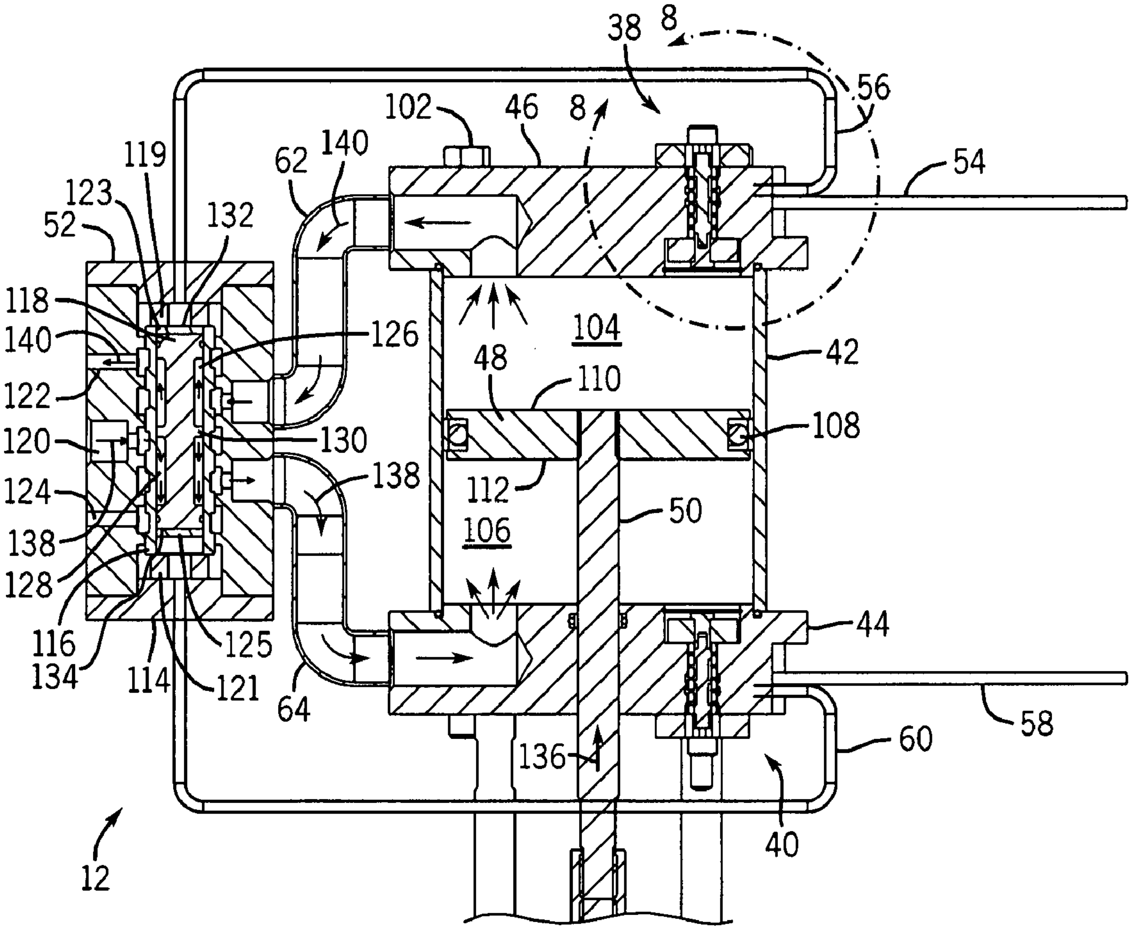
FIGS. 4-7 are cross-sectional views of the pneumatic motor of FIG. 3 during sequential stages of a cycle.

With reference to FIGS. 3 and 4, the pneumatic motor 12 may include an upper-pilot valve 38, a lower-pilot valve 40, a cylinder 42, a bottom head 44, a top head 46, an air-motor piston 48, a piston rod 50, and a main valve 52. To pneumatically or fluidly couple these components, the pneumatic motor 12 may include an upper-pilot signal path 54, an upper-pilot signal path 56, a lower-pilot signal path 58, a lower-pilot signal path 60, an upper primary air passage 62, and a lower primary air passage 64.

FIG. 8 is an enlarged view of the upper-pilot valve 38, which may also be referred to as a switching device, a magnetically actuated switching device, a magnetically actuated pilot valve, a piston position sensor, or a magnetically actuated valve. The upper-pilot valve 38 may include a magnet 66, a spool valve 68, an end cap 70, a sleeve 72, and a magnet stop 74.

The magnet 66 may be positioned such that an axis from its north pole to its south pole is generally parallel to the direction in which the spool valve 68 moves, as explained below. For example, in the orientation depicted by FIG. 8, the north and south poles of the magnet 66 may be oriented one over another. The magnet 66 may be an electromagnet or a permanent magnet, such as a neodymium-iron-boron magnet, a ceramic magnet, or a samarium-cobalt magnet, for instance.

The spool valve 68 may include a magnet mount 76, a lower seal 78, a middle seal 80, and an upper seal 82. The volume generally defined by the upper seal 82 and the middle seal 80 is referred to as an upper chamber 84, and the volume generally defined by the middle seal 80 and the lower seal 78 is referred to as a lower chamber 86. The upper chamber 84 may be in fluid communication with the upper-pilot signal path 56, and the lower chamber 86 may be in fluid communication with the upper-pilot signal path 54. In some embodiments, these passages may be in fluid communication regardless of the position of the spool valve 68 relative to the sleeve 72. The spool valve 68 may be generally rotationally symmetric (e.g., circular) and have a central axis 88 about which the various portions 78, 80, 82, 84, and 86 are generally concentric. The spool valve 68 may be manufactured, for example, machined on a lathe, from hardened metal, such as hardened stainless steel (e.g., 440C grade). The magnet mount 76 may couple, e.g., affix, the magnet 66 to the spool valve 68.

The end cap 70 may include exhaust ports 90 and 92 and a vent 94. The vent 94 may be in fluid communication with a top 96 of the spool valve 68, and the exhaust ports 90 and 92 may be selectively in fluid communication with the upper chamber 84 depending on the position of the spool valve 68, as explained below.

The sleeve 72 may have a generally circular-tubular shape sized such that it may form dynamic seals (e.g., slideable seals) with the lower seal 78, the middle seal 80, and the upper seal 82. In some embodiments, the sleeve 72 may be generally concentric about the central axis 88 of the spool valve 68. The sleeve 72 may have passages through which the upper-pilot signal path 54, the upper-pilot signal path 56, and the exhaust ports 90 and 92 may extend. The sleeve 72 may be manufactured from hardened metal, such as those discussed above. In certain embodiments, the sleeve 72 may form a matched set with the spool valve 68. In other words, the tolerance of the difference between outer diameter of the spool valve 68 and the inner diameter of the sleeve 72 may be configured to form a dynamic seal. In some embodiments, the spool valve 68 and sleeve 72 may form dynamic seals that are generally free of O-rings or other types of seals, e.g., U-cup or lip seals. Advantageously, the spool valve 68 may slide within the sleeve 72 with relatively little friction, which may tend to lower the amount of energy consumed by the spool valve 68 when it moves.

The magnet stop 74 may be integrally formed with the top head 46 and may include a pressure inlet 100. The pressure inlet 100 may place a bottom surface 103 of the magnet 66 in fluid communication with the interior of the cylinder 42. The pressure inlet 100 may be generally smaller than the magnet 66 to generally constrain movement of the magnet 66 within a range of motion.

Returning to FIG. 4, the lower-pilot valve 40 may be similar or generally identical to the upper-pilot valve 38. The lower-pilot valve 40 may be oriented upside down relative to the upper-pilot valve of 38. Consequently, the magnet 66 of the lower-pilot valve 40 may be proximate the interior of the cylinder 42.

The cylinder 42 may have a generally circular tubular shape with an inner diameter sized to form a dynamic seal with the air-motor piston 48. Tie rods 102 (see FIG. 3) may compress the walls of the cylinder 42 between the top head 46 and the bottom head 44.

With continued reference to FIG. 4, the top head 46 may be integrally formed with portions of the upper-pilot valve 38 and a portion of the upper primary air passage 62. The upper primary air passage 62 may extend through the top head 46, placing the upper primary air passage 62 in fluid communication with an upper interior portion 104 of the cylinder 42. Similarly, the bottom head 44 may be integrally formed with portions of the lower-pilot valve 40 and a portion of the lower primary air passage 64. The lower primary air passage 64 may be in fluid communication with a lower interior portion 106 of the cylinder 42.

The air-motor piston 48 may separate the upper interior portion 104 from the lower interior portion 106. The piston 48 may include a sealing member 108 (e.g., o-ring) that interfaces with the cylinder 42 to form a sliding seal. The air-motor piston 48 may include an upper surface 110 and a lower surface 112. The piston rod 50 may be affixed or otherwise coupled to the air-motor piston 48 and may extend through the bottom head 44 to the pump 14.

The main valve 52 may be referred to as a primary pneumatic switching device or a pneumatically controlled valve. The main valve 52 may include a housing 114, a sleeve 116, and a main spool valve 118. The housing 114 may include a primary air intake 120 and vents 122 and 124. The main spool valve 118 may form a number of sliding seals with the sleeve 116. Together, the main spool valve 118 and sleeve 116 may define an upper chamber 126 and a lower chamber 128. The upper chamber 126 and lower chamber 128 may be separated by a middle seal 130.

The sleeve 116 and the housing 114 may define a path and direction of travel for the main spool valve 118. This path and direction of travel can be seen by comparing the position of the main spool valve 118 in FIGS. 4-7, which depict the main spool valve 118 translating up and down in the housing 114. In other embodiments, the main spool valve 118 may travel a different path and/or may rotate, depending on the configuration of the main spool valve 118 and the housing 114.

In some embodiments, the main spool valve 118 may include a magnetic detent formed by static magnets 119 and 121 attached to the housing 114 and moving magnetically responsive materials 123 and 125 (e.g., ferromagnetic materials or other materials with a high magnetic permeability) attached to the main spool valve 118. The magnetically responsive materials 123 and 125 are illustrated in FIGS. 4-7 as a separate material from the main spool valve 118, but in some embodiments, the main spool valve 118 may be made of a magnetically responsive material. The magnets 119 and 121 may hold the main spool valve 118 against opposing ends of the main valve 52 until a threshold force is applied to the main spool valve 118, as explained below.

Depending on the embodiment, the magnetic detents may take a variety of forms. In certain embodiments, the positions of the magnets 119 and 121 and the magnetically responsive materials 123 and 125 may be reversed. That is, the magnets may be coupled to, and move with, the main spool valve 118, and the housing 114 may include or be coupled to a magnetically responsive material. In other embodiments, both the housing 114 and the main spool valve 118 may include magnets. These magnets may be oriented such that the north pole of the magnets in the housing is facing the south pole of the magnets on the main spool valve 118, or vice versa.

The present embodiment may include a variety of types of magnets. For instance, the illustrated magnets 119 and 121 may be an electromagnet or a permanent magnet, such as a neodymium-iron-boron magnet, a ceramic magnet, or a samarium-cobalt magnet, for instance.

The illustrated embodiment includes two magnetic detents, one at each end of the path through which the main spool valve 118 travels. The poles of the magnets 119 and 121 may be generally parallel to this direction of travel and the fields from these magnets may overlap the main spool valve 118 when the main spool valve 118 is positioned at the distal portions of its path. In other embodiments, the main spool valve 118 may include a single magnetic detent disposed at one end of the main spool valve's path, e.g., at the top of its travel.

Certain embodiments may include a single magnetic detent that employs magnetic repulsion instead of, or in addition to, magnetic attraction. For instance, the main spool valve 118 may include a magnet near its middle seal 130 with poles that extend generally perpendicular to the main spool valve's direction of travel, and the housing may include a repelling magnet positioned near the middle of the main spool valve's path, such that the repelling magnet pushes the main spool valve 118 either to the top or the bottom of the housing 111. That is, a single magnet disposed near the mid-section of the housing 111 may bias the main spool valve 118 against the top or the bottom of the housing 111, depending on where the main spool valve 118 is relative to the mid-point of its path. In some of these embodiments, the poles of the static, repelling magnet may be oriented generally perpendicular to the main spool valve's direction of travel and generally parallel to the moving magnet on the main spool valve 118.

A variety of fluid conduits may connect to the main valve 52. The upper-pilot signal path 56 may extend through the housing 114, placing it in fluid communication with a top surface 132 of the main spool valve 118. Similarly, the lower-pilot signal path 60 may be in fluid communication with a bottom surface 134 of the main spool valve 118. Depending on the position of the middle seal 130, the primary air intake 120 may be in fluid communication with either the upper primary air passage 62 via the upper chamber 126 or the lower primary air passage 64 via the lower chamber 128.

The pneumatic motor 12 may be connected to a source of a pressurized fluid, such as compressed air or steam. For instance, the pneumatic motor 12 may be connected to a central air compressor (e.g., factory air) via the primary air intake 120 and the pilot signal paths 54 and 58.

In operation, the pneumatic motor 12 may receive pneumatic power through the primary air intake 120 and output power through movement of the piston rod 50. To this end, the pneumatic motor 12 may repeat a cycle depicted by FIGS. 4-7. To signal the appropriate point at which to transition between the stages of this cycle, the pilot valves 38 and 40 may sense the position of the air motor piston 48 and switch between the states depicted by FIGS. 8 and 9. Consequently, in some embodiments, the pilot valves 38 and 40 may function as sensors that signal the main valve 52 when to redirect air flow from the primary air intake 120, as explained below.

Starting at an arbitrarily selected point in the cycle, FIG. 4 depicts the middle of an upstroke of the air-motor piston 48, which is depicted by arrow 136. At this stage, a primary air in-flow 138 is flowing in through the primary air intake 120 and is being directed to the lower primary air passage 64 by the main spool valve 118. To reach the lower primary air passage 64, the primary air in-flow 138 passes through the lower chamber 128. Once in the lower primary air passage 64, the primary air in-flow 138 passes into the lower interior portion 106 of the cylinder 42. As the lower interior portion 106 is pressurized by the primary air in-flow 138, a force is applied to the lower surface 112 of the air-motor piston 48, and the air-motor piston 48 translates upwards, pulling the piston rod 50 with it, as indicated by arrow 136.

The upper interior portion 104, above the air-motor piston 48, may be evacuated by a primary air out-flow 140 during an upstroke. The primary air out-flow 140 may pass through the upper primary air passage 62 into the upper chamber 126 of the main valve 52 and out through the vent 122, to atmosphere. In the illustrated embodiment, the primary air in-flow 138 and the primary air out-flow 140 may continue to follow this path until the air-motor piston 48 approaches the top head 46, at which point the pneumatic motor 12 may transition to the state depicted by FIG. 5.

Figure 5:
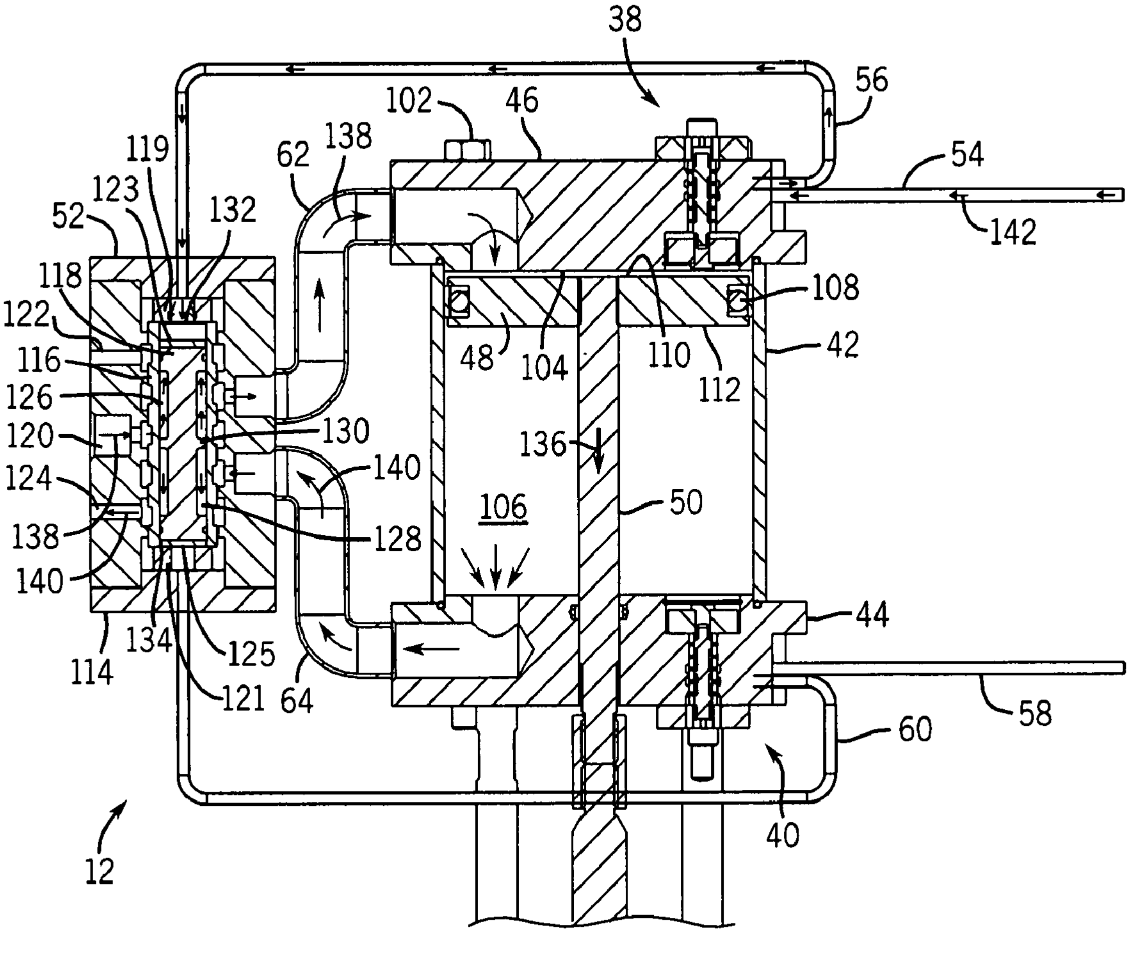

In FIG. 5, the air-motor piston 48 is at the top of its stroke, and the main valve 52 has reversed the primary air flows 138 and 140. As explained below, in the present embodiment, the upper-pilot valve 38 magnetically senses that the air-motor piston 48 is near the top of its stroke and directs a burst of air into the top of the main valve 52, thereby shifting the position of the main spool valve 118.

The upper-pilot valve 38 may transition between the states depicted by FIGS. 8 and 9 when the air-motor piston 48 reaches the top of its stroke. Initially, the upper-pilot valve 38 may be in the state depicted by FIG. 8, with the spool valve 68 in an elevated, or recessed, position within the sleeve 72 (hereinafter "the first position"). When the spool valve 68 is in the first position, the upper-pilot signal path 56 may be in fluid communication with the exhaust ports 90 and 92 via the upper chamber 84, and the upper-pilot signal path 54 may be isolated from the upper-pilot signal path 56 by the middle seal 80 of the spool valve 68. In other words, the upper-pilot signal path 56 may be vented, and the upper-pilot signal path 54 may be sealed. The spool valve 68 may be held in the first position by magnetic attraction between the sleeve 72 and the magnet 66.

As the air-motor piston 48 reaches the top of its stroke, the upper-pilot valve 38 may transition from the first position, depicted by FIG. 8, to a second position, which is depicted by FIG. 9. The magnet 66 may be attracted to the air-motor piston 48 and, as a result, the spool valve 68 may be pulled downward. In some embodiments, the air-motor piston 48 may include a magnet 146 to increase the attractive force. Alternatively, or additionally, the air motor piston 48 may include a material having a high magnetic permeability, e.g., a material with a magnetic permeability greater than 500 $\mu N/A^2$. The magnet 66 may be pulled downward until it hits the magnet stop 74, at which point the spool valve 68 may be in the second position.

When the spool valve 68 is in the second position, the upper-pilot signal path 54 may be in fluid communication with the upper-pilot signal path 56 via the upper chamber 84. As a result, a pneumatic signal 142, for example an airflow and/or pressure wave, may be transmitted through the upper-pilot signal path 56 to the main valve 52.

Returning briefly to FIGS. 4 and 5, the pneumatic signal 142 may drive the main spool valve 118 from a first position depicted by FIG. 4 to a second position depicted by FIG. 5. The pneumatic signal 142 may elevate the air pressure acting upon the top surface 132 of the main spool valve 118, and overcome a magnetic attraction between the magnet 119 and the magnetically responsive material 123. As this force is overcome, the main spool valve 118 may translate through the sleeve 116 to the second position depicted in FIG. 5. The main spool valve 118 may be held in this position by magnetic attraction between the magnet 121 and the magnetically responsive material 125. In the present embodiment, moving the main spool valve 118 from the first position to the second position reverses the primary air flows 138 and 140. At this point, the air-motor piston 48 may begin its downstroke, as illustrated by arrow 146 in FIG. 5.

As the air-motor piston 48 translates downward, away from the top head 46, the upper-pilot valve 38 may transition back from the second position, depicted by FIG. 9, to the first position, depicted by FIG. 8. The primary air in-flow 138 into the upper interior portion 104 of the cylinder 42 may elevate the pressure of the upper interior portion 104. In addition to driving the air motor piston 48 downwards, this increased pressure may propagate through the pressure inlet 100 of the upper-pilot valve 38, and, as a result, the spool valve 68 may be driven upwards, back into the first position, depicted by FIG. 8. Magnetic attraction between the magnet 66 and the sleeve 72 may retain the spool valve 68 in the first position until the next time the air motor piston 48 arrives.

Advantageously, in the illustrated embodiment, the pilot valves 38 and 40 are returned to their original, closed position by air pressure rather than a mechanical coupling, which could wear and increase mechanical stresses in the motor 12. In some embodiments, the pilot valves 38 and 40 may be referred to as pneumatically-reset pilot valves. Notably, the pilot valves 38 and 40 are reset in this embodiment with the air pressure that they modulate via the main valve 52 (i.e., the pressure inside the cylinder 42). As a result, the illustrated pilot valves 38 and 40 self-regulate their position. That is, the pilot valves 38 and 40, in the present embodiment, are returned by the air pressure they were initially moved to increase, so pressure in the cylinder 42 acts as a pneumatic feedback control signal to the pilot valves 38 and 40. In other words, the pilot valves 38 and 40 are configured to terminate the pneumatic signal they send to the main valve 52 in response to a change (e.g., increase) in pressure in the portion of the cylinder 42 that they sense.

In some embodiments, the magnet 66 may seal against the top head 46, so the pressure in the cylinder 42 acts against the larger, bottom surface 103 of the magnet. In other embodiments, the bottom seal 78 may define the surface area over which the pressure in the cylinder acts. Some designs may include a separate piston to reset the pilot valves 38 and 40.

In some embodiments, the pilot valves 38 and 40 may not necessarily be both magnetically actuated and pneumatically returned. In some embodiments, the pilot valves 38 and 40 may be initially displaced by a force other than magnetic attraction or repulsion. For instance, they may be driven toward the piston 48 by a cam or other device and returned by air pressure in the cylinder 42. Conversely, in another example, the pilot valves 38 and 40 may be drawn toward the piston 48 by magnetic attraction and returned by a member extending from the piston 48, rather than being pneumatically returned. In some embodiments, a magnetic force may return the pilot valves 38 and 40, e.g., a magnetic force weaker than the one which pulls them toward the air-motor piston 48.

To summarize before returning to FIGS. 4-7, at the top of a stroke of the air-motor piston 48, the upper-pilot valve 38 may magnetically sense the position of the air-motor piston 48 and pneumatically switch the main valve 52 to begin a downstroke.

FIG. 5 illustrates the beginning of a downstroke, and FIG. 6 illustrates the middle of a downstroke. In FIG. 5, the air-motor piston 48 is still near the top head 46, and the pneumatic signal 142 is still being applied to the main valve 52 via the upper-pilot signal path 56. In FIG. 6, the air-motor piston 48 has translated away from the upper-pilot valve 38, and the pneumatic signal 142 is no longer applied to the main valve 52. At this point, the upper-pilot signal path 56 may be vented, as previously discussed with reference to FIG. 8.

Throughout the downstroke, the primary air in-flow 138 may pass through the primary air intake 120, into the upper chamber 126, and through the upper primary air passage 62 to the upper interior portion 104. The primary air out-flow 140 may flow from the lower interior portion 106, through the lower primary air passage 64, and out the vent 124 via the lower chamber 128. The resulting pressure difference across the air-motor piston 48 may drive the piston rod 50 downward, as depicted by arrow 146.

FIG. 7 illustrates the bottom of a downstroke. During the transition from a downstroke to an upstroke, the lower-pilot valve 40 may transition between the states depicted by FIGS. 8 and 9. Like the upper-pilot valve 38, the lower-pilot valve 40 may magnetically sense the position of the air-motor piston 48 and assert pneumatic signal 142 through the lower-pilot signal path 60. The pneumatic signal 142 may drive the main spool valve 118 from the second position back to the first position, thereby reversing the primary air flows 138 and 140 and initiating an upstroke.

The air-motor piston 48 may move upwards through the state depicted by FIG. 4, and the cycle illustrated by FIGS. 4-7 may repeat indefinitely. At the end of each stroke, the pilot valves 38 and 40 may signal the main valve 52 to reverse the direction of primary air flows 138 and 140 with the pneumatic signal 142. The resulting up and down oscillations of the piston rod 50 may be harnessed by the pump 14 to convey the coating liquid through the spray system 10 and out the spray gun 20. The speed of the pneumatic motor 12 may be regulated, in part, by adjusting the pressure and/or flow rate through the primary air intake 120, e.g., via the regulator assembly 26.

Advantageously, in the present embodiment, the pilot valves 38 and 40 sense the position of the air-motor piston 48 without contacting other moving parts. Further, the spool valves 68 may slide within the sleeves 72 with very little friction. As a result, in some embodiments, very little energy may be wasted when sequencing the primary air flows 138 and 140. Moreover, in certain embodiments, the pilot valves 38 and 40 may tend to have a long useful life due to the low friction and contactless actuation with no seals to wear. Less contact and friction may tend to reduce wear and fatigue. Additionally, in some embodiments, the pilot valves 38 and 40 may be actuated without biasing a resilient member, e.g., a reed or spring, which might otherwise fatigue and shorten the useful life of the pilot valve. Providing yet another advantage, some embodiments may operate even when relatively low pressure air is supplied to the primary air intake 120. For instance, some embodiments may be capable of operating at pressures less than 25 psi, 15 psi, 5 psi, or 2 psi.

Further, in certain embodiments, the pilot valves 38 and 40 may be more reliable than conventional designs when exposed to dirty air. Air with particulates or vapors may form deposits on valve parts, and in certain types of valves, for instance, some reed valves, the deposits may prevent the valves from operating.

The presently discussed techniques are applicable to a wide variety of embodiments. For example, as mentioned above, the air-motor piston 48 may include a magnet 146 (see FIG. 9) to increase the attractive force pulling on the magnet 66 in the pilot valves 38 and 40. In such embodiments, the poles of the magnet 66 and the upper-pilot valve 38 may be oriented the same as the pole of the magnet 66 in the lower-pilot valve 40. That is, if the north pole of the magnet 66 in the upper-pilot valve 38 is facing downwards, the south pole of the magnet 66 in the lower-pilot valve 40 may be facing upwards, and vice versa. Alternatively, or additionally, a high magnetic permeability material (e.g., a ferrous material) may be coupled to the spool valve 68 to draw the spool valve 68 towards the magnet 146 on the air-motor piston 48. In some embodiments, the magnet 66 may be omitted, and an attraction between a high magnetic permeability material coupled to the spool valve 68 and the magnet 146 may actuate the spool valve 68, which is not to suggest that other features discussed herein may not also be omitted.

In some embodiments, other types of pilot valves 38 and/or 40 may be employed. In one example, the pilot valves 38 and/or 40 may include seals, such as a lip seal to reduce machining costs. In another example, the dynamic seal may be formed between a rotating sealing member and a generally static cylinder, or vice versa. The rotating member may be coupled to a magnet 66 to apply a torque when the air motor piston 48 is proximate. In another embodiment, instead of, or in addition to, returning to the state illustrated by FIG. 8 the pilot valves with air pressure, the pilot valves 38 and 40 may be biased away from the air motor piston 48 by static magnets or springs.

Figure 11:
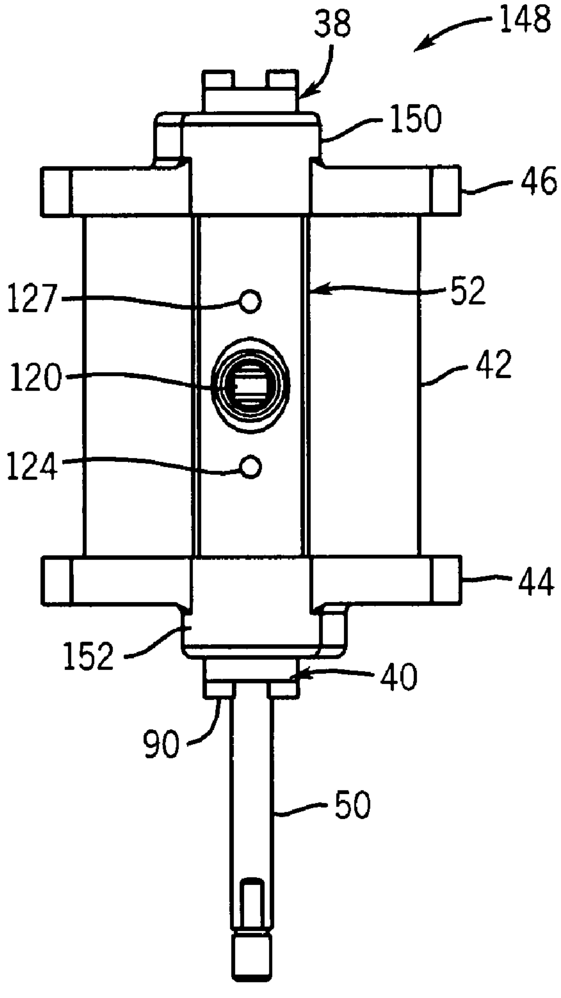
FIG. 11 is an elevation view of the pneumatic motor of FIG. 10.
Figure 12:
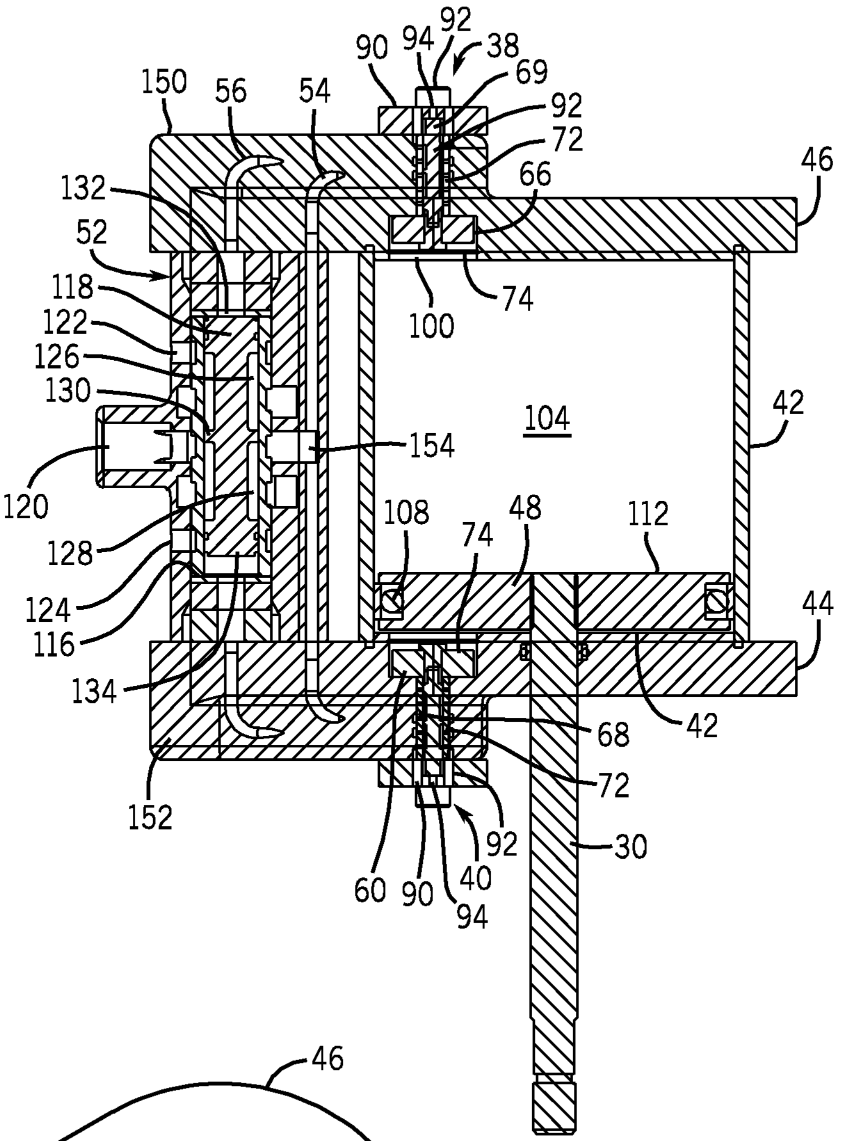
FIG. 12 is a cross-sectional view of the pneumatic motor of FIG. 10.
Figure 13:
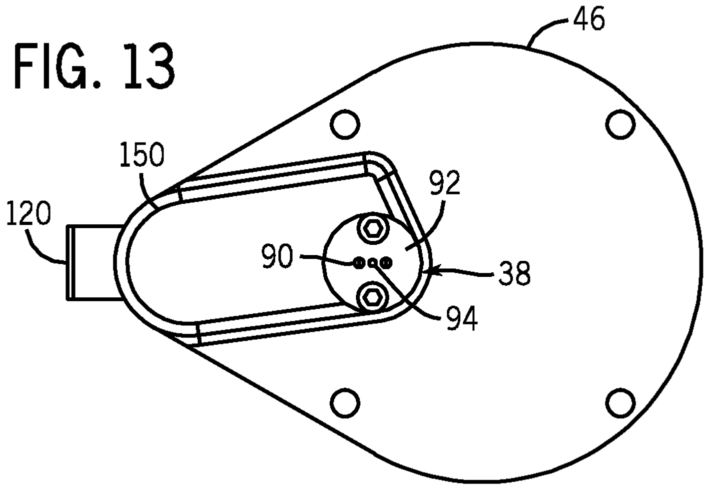
FIG. 13 is a top view of the pneumatic motor of FIG. 10.
Figure 14:
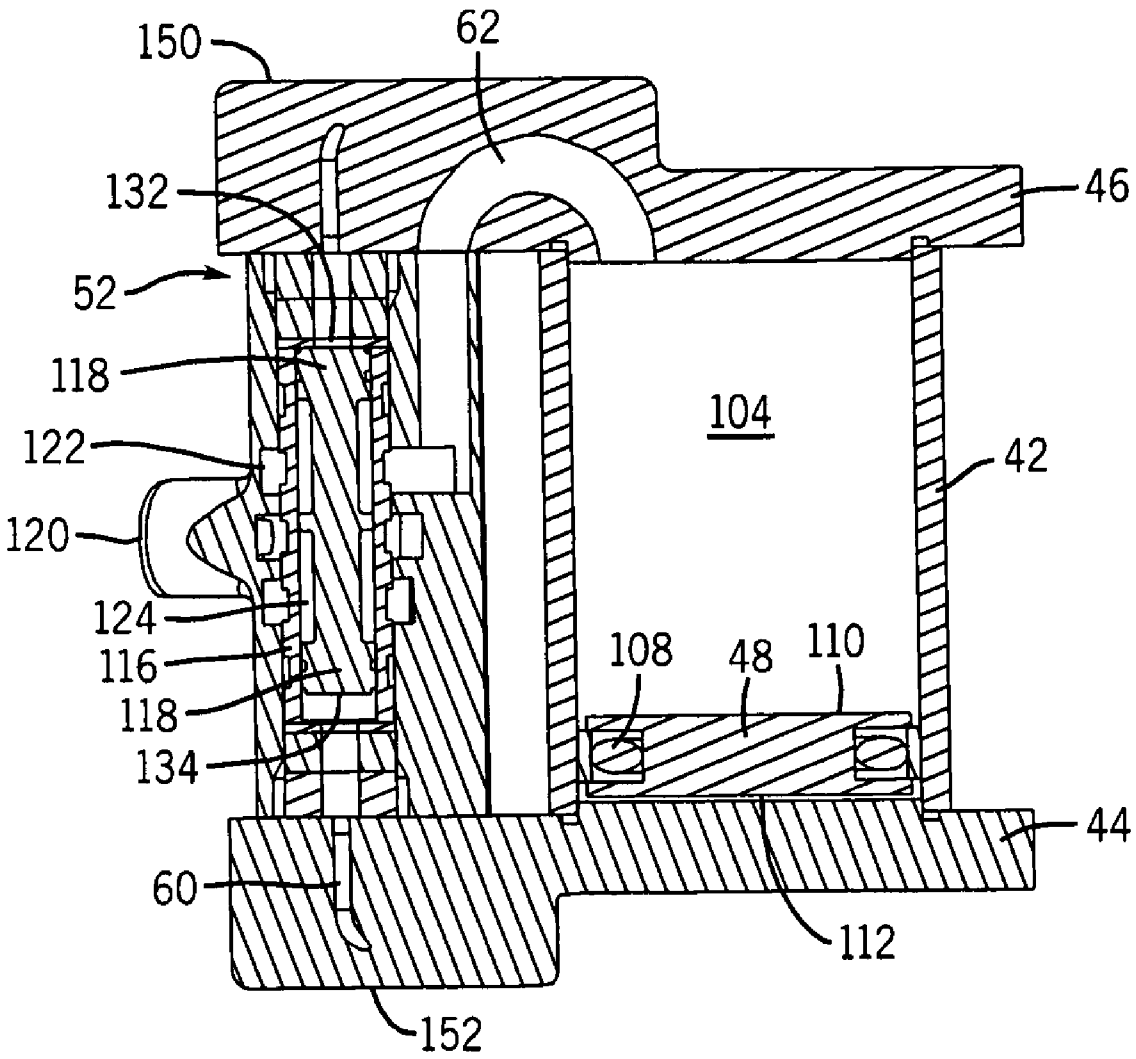
FIG. 14 is another cross-sectional view of the pneumatic motor of FIG. 10.

FIGS. 10-14 illustrate another pneumatic motor 148. In the pneumatic motor 148, a variety of the previously discussed features may be integrated into shared housings or components. For example, the pneumatic motor 148 may include a top integrated manifold 150 and a bottom integrated manifold 152. The integrated manifold 150 and 152 may be integrally formed, e.g., machined and/or cast from a single piece of material, with the top head 46 and the bottom head 44, respectively. As illustrated by the cross-sectional view of FIG. 14, the upper primary air passage 62 may be routed directly from the main valve 52 through the top integrated manifold 150. The bottom integrated manifold 152 may be similarly configured with respect to the lower primary air passage 64. Additionally, the upper-pilot signal path 56 and upper-pilot signal path 54 may be, at least in part, integrally formed with the top integrated manifold 150, and the lower-pilot signal path 58 and lower-pilot signal path 60 may be integrally formed with the bottom integrated manifold 152. As illustrated by FIG. 11, in some embodiments, the top integrated manifold 150 may be rotationally symmetric with the bottom integrated manifold 152 but not reflectively symmetric with the bottom integrated manifold 152. That is, the manifolds 150 and 152 may be generally equally and oppositely askew. Additionally, in the illustrated embodiment, the pilot signal paths 54 and 58 are in fluid communication with the primary air intake 120 via a manifold 154 integrally formed with the main valve 52.

Figure 15:
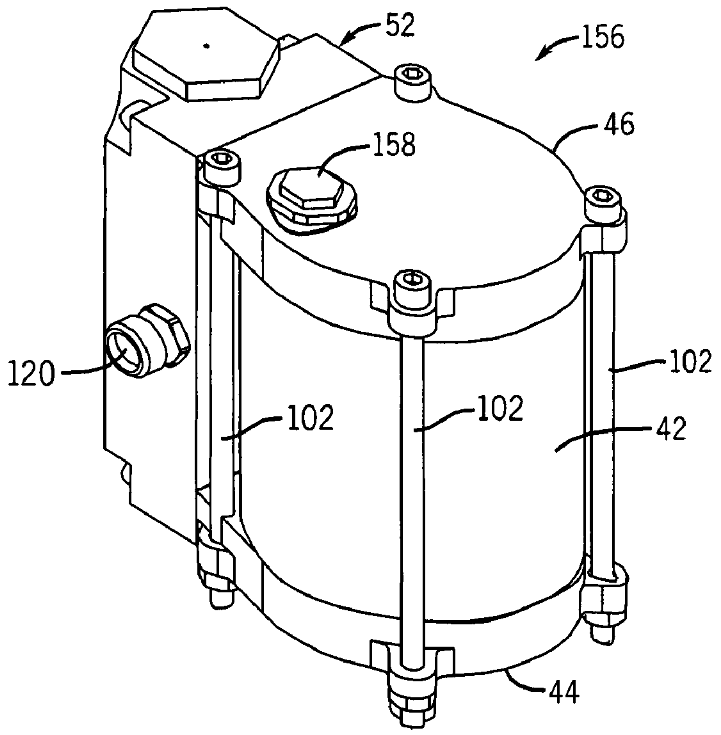
FIG. 15 is a perspective view of a third embodiment of a pneumatic motor in accordance with an embodiment of the present technique.
Figure 16:
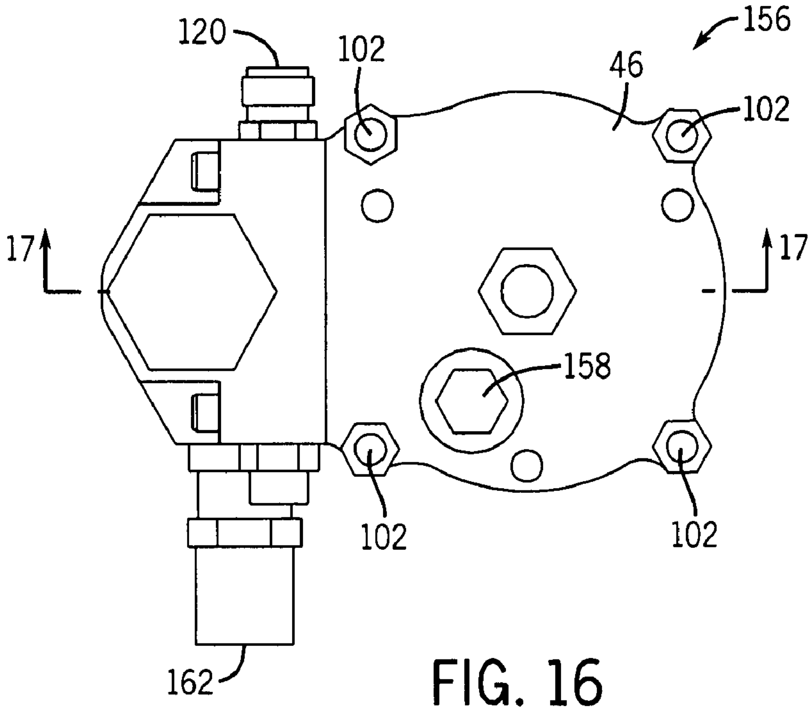
FIG. 16 is a top view of the pneumatic motor of FIG. 15.
Figure 17:
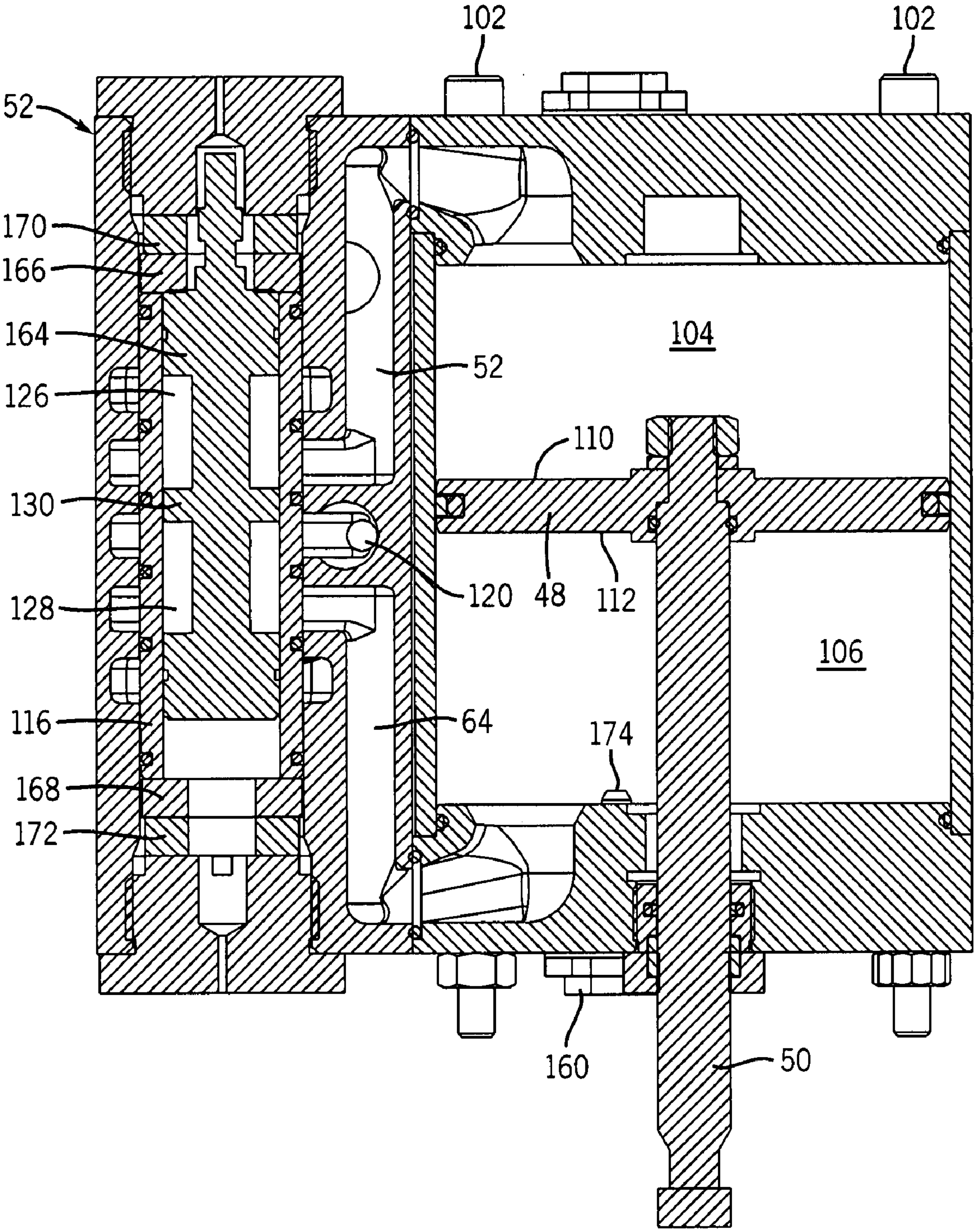
FIG. 17 is a cross-sectional view of the pneumatic motor of FIG. 15.

FIGS. 15-17 illustrate a third embodiment of a pneumatic motor 156. The illustrated pneumatic motor 156 includes mechanically-actuated pilot valves 158 and 160, an exhaust silencer 162, and a main valve 52 with a magnetic detent, which is formed by magnets 170 and 172 and a ferromagnetic spindle 164. The magnets 170 and 172 may magnetically retain the spindle 164 at opposing ends of the sleeve 116 in which the spindle 164 slides until a burst of air pressure from the mechanically-actuated pilot valves 158 or 160 overcomes this magnetic detent. The mechanically-actuated pilot valves 158 and 160 may selectively apply air pressure to the top or bottom of the spindle 164 when the air-motor piston 48 mechanically contacts a valve member 174. The main valve 52 may also include shock absorbing pads 166 and 168 configured to cushion the impact when the spindle 164 reaches the top or bottom of the sleeve 116. The shock absorbing pads 166 and 168 may be made of polyurethane, rubber, or other appropriate materials. In the present embodiment, the shock absorbing pads in 166 and 168 are disposed between the magnets 170 and 172 and the spindle 164. The thickness of the shock absorbing pads 166 and 168 may be selected with the strength of the magnets 170 in 172 in mind, so that the magnets 170 and 172 retain the spindle 164 until a pneumatic signal is received from the mechanically-actuated pilot valves 158 or 160.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor, comprising:

a piston disposed within a cylinder;

a first pilot valve disposed in a first end of the cylinder;

a second pilot valve disposed in a second end of the cylinder opposite the first end; and a main valve configured to control a flow of a fluid into the cylinder, wherein the main valve comprises:

a housing;

a valve member disposed in the housing; and a magnetic detent configured to resist movement of the valve member within the housing by applying a magnetic force to the valve member;

wherein the first and second pilot valves are configured to be actuated by the piston.

2. The motor of claim 1, wherein the valve member comprises a spool valve.

3. The motor of claim 1, wherein the main valve comprises a shock absorber disposed in the housing near an end of a path through which the valve member is configured to travel.

4. The motor of claim 3, wherein the shock absorber comprises polyurethane.

5. The motor of claim 1, wherein the main valve is configured to alternate an airflow between opposing sides of the piston.

6. The motor of claim 1, wherein the valve member seals directly against the housing without intervening sealing members.

7. The motor of claim 1, wherein the housing is coupled to a first side of the cylinder via a first fluid passage and a second side of the cylinder via a second fluid passage, wherein the first side is on a different side of the piston from the second side.

8. The motor of claim 1, wherein the magnetic detent comprises a static magnet coupled to the housing and a moving magnet coupled to the valve member, wherein the moving magnet moves with the valve member, and wherein the moving magnet and static magnet are oriented such that they have opposite magnetic poles facing each other.

9. The motor of claim 1, wherein the magnetic detent comprises a magnet coupled to the housing and wherein the valve member comprises a magnetically responsive material.

10. The motor of claim 1, wherein the magnetic detent comprises a magnet coupled to the valve member and a magnetically responsive material coupled to the housing.

11. The motor of claim 1, comprising another magnetic detent, wherein the magnetic detents are disposed on opposite sides of the valve member.

12. A valve, comprising:

a housing;

a spool valve disposed in the housing, the spool valve comprising a middle seal that defines an upper chamber and a lower chamber in the housing; and a magnetic detent between the housing and the spool valve, wherein the magnetic detent comprises a stationary magnet coupled to the housing, wherein the spool valve comprises a magnetically responsive material, and wherein the spool valve is configured to be magnetically biased by the stationary magnet.

13. The valve of claim 12, wherein the housing comprises:

a primary fluid intake positioned to flow fluid into either the upper chamber or the lower chamber, depending on the position of the middle seal;

an upper fluid outlet in fluid communication with the upper chamber; and a lower fluid outlet in fluid communication with the lower chamber.

14. The valve of claim 13, wherein the spool valve is biased against the housing by the magnetic detent such that the middle seal is disposed on a side of the primary fluid intake.

15. The valve of claim 12, wherein the spool valve does not comprise a magnet.

16. A method of operating an air motor, the method comprising:

magnetically biasing a valve member in a housing against a first side of the housing to hold the valve member in a first position;

directing a fluid flow to a first end of a cylinder having a piston disposed therein when the valve member is in the first position, wherein the fluid flow drives the piston from a first end of the cylinder to a second end of the cylinder opposite the first end;

actuating a first pilot valve disposed in the second end of the cylinder via the piston; and pneumatically overcoming the magnetic bias by adjusting a pressure of a fluid in contact with the valve member to drive the valve member to a second position in response to the actuation of the first pilot valve.

17. The method of claim 16, comprising magnetically biasing the valve member against an opposing side of the housing in the second position.

18. The method of claim 17, comprising pneumatically driving the valve member back to the first position.

19. The method of claim 16, comprising absorbing energy with a shock absorber when the valve member reaches the second position.

20. The method of claim 16, comprising:

magnetically biasing the valve member against a second side of the housing to hold the valve member in the second position;

directing the fluid flow to a second end of the cylinder when the valve member is in the second position, wherein the fluid flow drives the piston from the second end of the cylinder back to the first end of the cylinder;

actuating a second pilot valve disposed in the first end of the cylinder via the piston; and pneumatically overcoming the magnetic bias by adjusting the pressure of the fluid in contact with the valve member to drive the valve member back to the first position in response to the actuation of the first pilot valve.

* * * * *